United States Patent [19]

Stöckel

[11] Patent Number: 4,818,993
[45] Date of Patent: Apr. 4, 1989

[54] ELECTRONIC CONTROL SYSTEM FOR CONTROLLING SEVERAL REMOTE DEVICES

[75] Inventor: Günter Stöckel, Nuremberg, Fed. Rep. of Germany

[73] Assignee: Siemens Aktiengesellschaft, Berlin and Munich, Fed. Rep. of Germany

[21] Appl. No.: 8,786

[22] Filed: Jan. 29, 1987

[30] Foreign Application Priority Data

Feb. 27, 1986 [DE] Fed. Rep. of Germany ....... 3606400

[51] Int. Cl.⁴ .............................................. G05B 23/02
[52] U.S. Cl. ...................... 340/825.060; 340/825.220
[58] Field of Search ...................... 340/825.06, 825.07, 340/825.22, 825.23; 364/200

[56] References Cited

U.S. PATENT DOCUMENTS 3,965,335 6/1976 Ricci et al. ...................... 340/825.22
4,100,601 7/1978 Kaufman et al. .................... 364/200
4,365,297 12/1982 Grisham, Jr. ........................ 364/200
4,418,333 11/1983 Schwarzbach et al. ........ 340/825.22
4,626,984 12/1986 Unruh et al. .................... 340/825.06

FOREIGN PATENT DOCUMENTS 2559287 2/1984 France .

OTHER PUBLICATIONS

Reduzierung der Verkabelungskosten beim Automatisierungssystem Simatic S5 mit Elektronischer Klemmenleiste 484, Siemens-Energietechnik 6 (1984) Heft 2, pp. 54-59 (No Translation).

Primary Examiner—Donald J. Yusko
Attorney, Agent, or Firm—Kenyon & Kenyon

[57] ABSTRACT

The invention relates to an electronic control device, in which subordinated individual control units (8) for individual control elements (3, 4) such as motors, are provided. Each individual control unit (8) has a separate module (9) with a processor (91) and a program memory (92), in which a number of control functions are stored. The respectively required function can be activated, for instance, by a selector switch (93).

3 Claims, 3 Drawing Sheets

ELECTRONIC CONTROL SYSTEM FOR CONTROLLING SEVERAL REMOTE DEVICES

BACKGROUND OF THE INVENTION a. Field of Invention

The invention relates to an electronic control system for a subordinated control unit consisting of at least one central unit, several peripheral devices to which the equipment to be controlled are connected, and optionally a bus system for connecting the central unit and the peripheral devices.

b. Description of the Prior Art

With increasing automation in all branches of industry, for insurance in chemistry, it becomes more and more important for reasons of availability to relocate certain standard functions such as the control of motors and valves, from a central unit to an individual control plane. In the individual control plane, processes required for normal operation can then be continued to be controlled even if the central unit fails. Through the use of individual control units (ESU) the central unit is additionally relieved of standard functions so that it can act only as the connecting member between the individual control planes. This frees the central unit for other purposes, for instance, for displaying the state of the process.

Heretofore the individual control planes were implemented with special modules developed for each individual function as required. Alternatively, a mixture of discrete circuits and special software were used in the central unit. A typical module of this type, for instance, for a periphery group for the direct control of proportional and servo valves is described, for instance, in the Journal Siemens-Energietechnik 1984, No. 2, pages 54 to 59.

SUMMARY OF THE INVENTION

It is an object of the present invention to provide a system which can be realized with a control computer and several different subordinated individual control units constructed from a single device.

The present invention is based on a smart control unit with a voltage supply of its own which can be expanded and developed, depending on the requirements of the individual function, as desired in a modular manner with standard digital and/or analog input/output modules. In an embodiment of the invention, the inputs/output devices can also be part of the central unit. The central unit advantageously includes a separate microprocessor which receives the coordinating commands via the periphery or directly via another data interface. The processor evaluates these signals, interconnects them logically in accordance with preselected criteria and connects the individual control unit. Since the periphery bus of the central unit and the internal bus of the individual control plane are electrically and mechanically separated from each other, an independent fault diagnosis can be carried out for the individual control unit and displayed, for instance, via separate outputs.

The individual functions of the individual subordinate control unit which are required, for instance, for controlling for motors, valves, etc. are stored as software in the memory and are stored and recalled by way of hardware or from the central unit.

Thereby, depending on the state of development, practically any control function can be realized, i.e., input/output modules, signal generation, etc. By plugging in input modules, also subordinate manual control units can be connected or additional interlocks can be made. With such a flexible and modular universal individual control plane and standard modules, any individual control function can be attained with the same hardware and software dedicated to the specified function. With a compact and enclosed design, the individual control unit can also be installed directly at the process site.

In summary, the system described above has the following advantages over conventional, known individual control members: depending on the function, modular expansion with standard peripheral modules is possible due to the connection of the individual control unit as a peripheral module, expensive coupling, for instance, via a serial interface is not required. Faults can be diagnosed and displayed separately for the central unit and the individual control units. Likewise, any desired display can be realized on the plan of the individual control unit. By a relatively simple expansion of the software, a change or supplementation of the individual control functions is also possible. The individual control units can be coupled to each other through the central unit.

BRIEF DESCRIPTION OF THE DRAWINGS

The invention will be explained in greater detail in conjunction with the drawing, wherein.

DETAILED DESCRIPTION OF THE INVENTION

Figure 1:
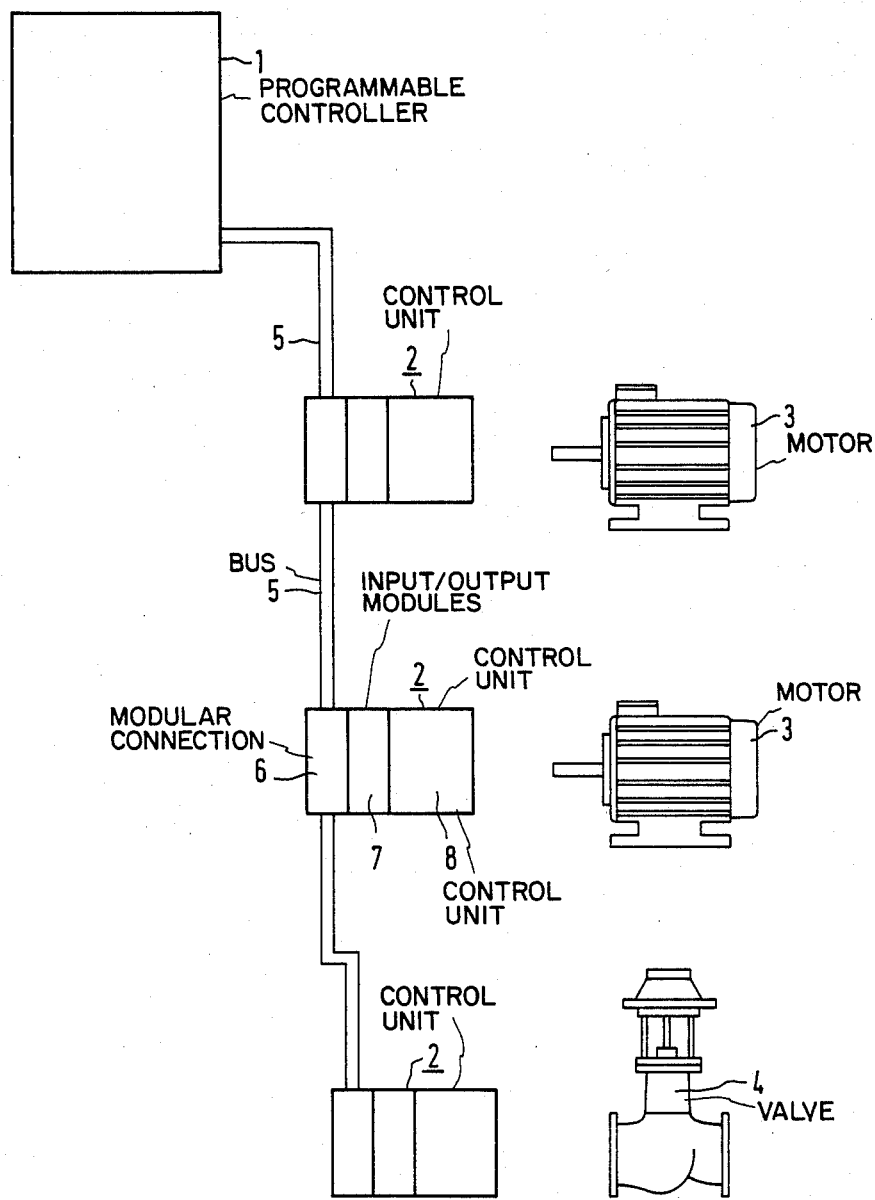
FIG. 1 shows the basic block diagram of a control system constructed in accordance with the invention.

As can be seen in FIG. 1, there is provided an electronic control system for controlling a process, having a central control unit 1, which may consist of a computer or other similar programmable controller. This central unit 1 is coupled via a bus system 5 with several modular remote control units 2 which are provided to control individual devices such as motors 3 or valve 4.

Figure 2:
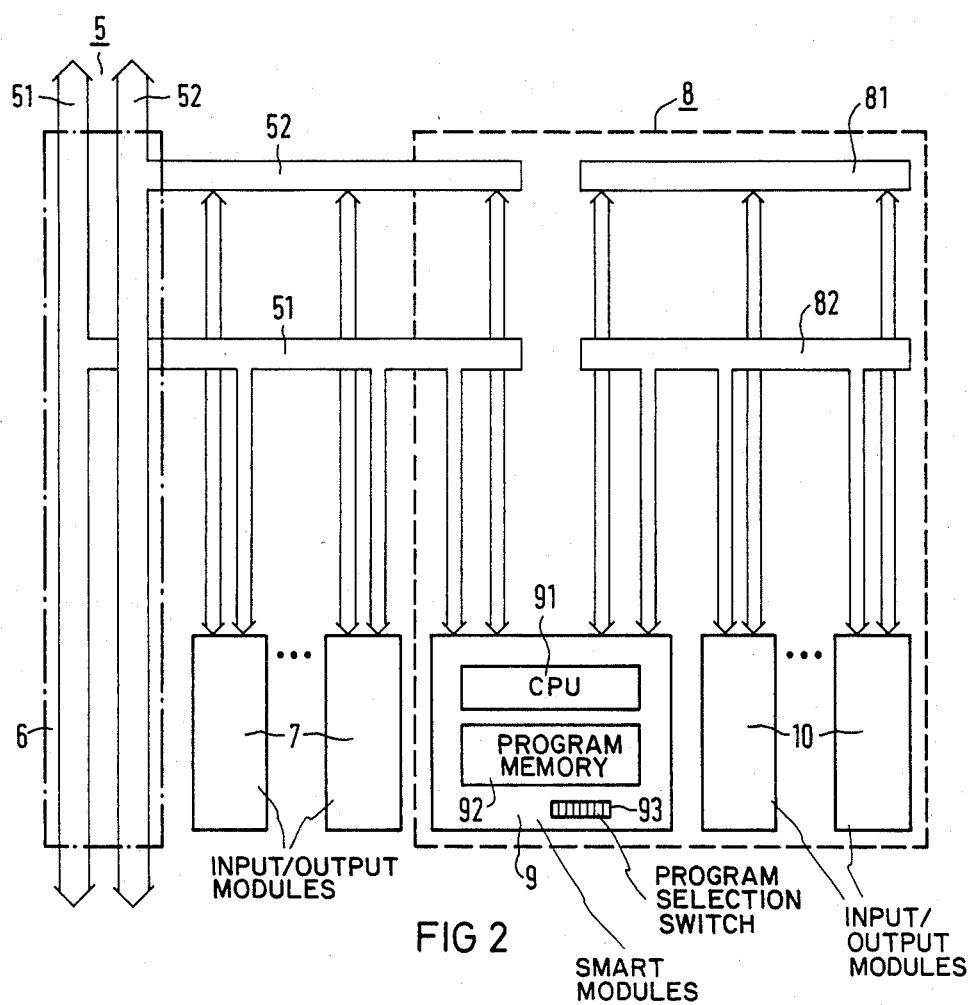
FIG. 2 shows the bus connection combined in a module carrier for an individual control unit.

As it can be seen from FIG. 2, in which a block diagram of a modular carrier unit is shown, each remote control unit includes input/output modules 7 connected to the periphery bus 5. The bus 5 may be separated into a data bus 51 and an address bus 52, and is connected to the unit 2 by a modular connection 6, through which signals are fed. Additionally, an individual control unit 8 is provided on the modular carrier. This individual control unit 8 consists of a module 9 which is coupled on the one hand to the periphery bus 5 and on the other hand, to the data bus 81 and the address bus 82 of the individual control unit. Buses 81 and 82 are further connected input/output modules 10 which address the devices to be controlled such as motors 3. The smart module 9 which transacts the traffic between the central unit and the input/output modules 10, consists of a central processing unit 91 in the form of a processor and a program memory 92 which contains besides the operating system, a number of control function programs. The desired control function can be set by a program selection switch 93 or alternatively by central unit 1.

The periphery bus 5 and the bus system 81, 82 of the individual control plane are mechanically and electrically separated independent from each other and are coupled only via the module 9.

Figure 3:
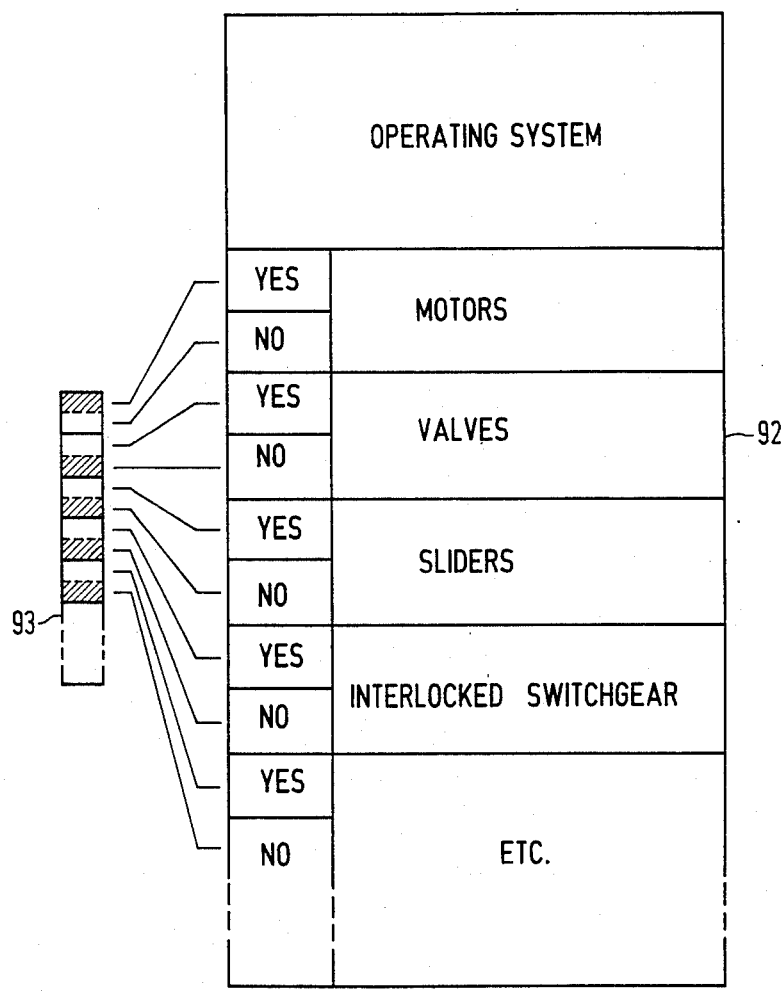
FIG. 3 shows the program memory of the control module.

FIG. 3 shows the program memory 92 of the module 9. As can be seen, the memory contains several software programs, each being provided to control motors, valves, sliders, interlocked switchgear etc. Depending on the position of the program selector switch 93, one of these control programs is operative such as for example a program for controlling a motor.

What is claimed is:

1. An electronic system for controlling several different devices comprising:
    a. a central processing unit;
    b. peripheral control elements, each being connected to at least one of said devices; and
    c. a peripheral bus interconnecting said central unit and said peripheral control elements, each said peripheral control element comprising:
        (i) a connection module connected to said peripheral bus for exchanging messages with said central processing unit;
        (ii) a control module connected to said connection module and having a control processing unit, a memory containing an operating system and several control programs, each program being provided to control one of said devices, and a selector switch, said control program being selectively activated by said selector switch;
        (iii) first input/output modules coupled to said devices;
        (iv) an internal bus for connecting said control module to said first input/output modules; and
        (v) second input/output devices connected directly to said connection module.

2. The control system according to claim 1, wherein said periphery bus and said internal bus are mechanically and electronically independent from each other.

3. The control device according to claim 1, wherein said control module further comprises a separate voltage supply.

* * * * *